United States Patent
Lacy et al.

(10) Patent No.: US 8,225,614 B2
(45) Date of Patent: Jul. 24, 2012

(54) SHIM FOR SEALING TRANSITION PIECES

(75) Inventors: Benjamin Paul Lacy, Greer, SC (US);
Mehmet Demiroglu, Troy, NY (US);
Neelesh Nandkumar Sarawate,
Niskayuna, NY (US)

(73) Assignee: General Electric Company,
Schenectady, NY (US)

( * ) Notice: Subject to any disclaimer, the term of this patent is extended or adjusted under 35 U.S.C. 154(b) by 0 days.

(21) Appl. No.: 12/900,072

(22) Filed: Oct. 7, 2010

(65) Prior Publication Data

US 2012/0085103 A1    Apr. 12, 2012

(51) Int. Cl.
*F02C 7/28*    (2006.01)
(52) U.S. Cl. ................. 60/800; 60/752; 60/796
(58) Field of Classification Search ........... 60/752, 60/796, 798, 800
See application file for complete search history.

(56) References Cited

U.S. PATENT DOCUMENTS

| | | | |
|---|---|---|---|
| 3,018,624 A * | 1/1962 | Bernard et al. ............. | 60/39.37 |
| 3,657,882 A * | 4/1972 | Hugoson ......................... | 60/798 |
| 4,016,718 A * | 4/1977 | Lauck ............................ | 60/800 |
| 5,125,796 A | 6/1992 | Cromer | |
| 5,400,586 A * | 3/1995 | Bagepalli et al. ............. | 60/800 |
| 5,470,198 A | 11/1995 | Harrogate et al. | |
| 6,162,014 A * | 12/2000 | Bagepalli et al. .......... | 415/170.1 |
| 6,450,762 B1 | 9/2002 | Munshi | |
| 6,547,257 B2 | 4/2003 | Cromer | |
| 6,571,560 B2 * | 6/2003 | Tatsumi et al. ................. | 60/800 |
| 6,652,231 B2 * | 11/2003 | Vedantam et al. ......... | 415/214.1 |
| 7,870,738 B2 * | 1/2011 | Zborovsky et al. ............. | 60/752 |
| 2002/0121744 A1 * | 9/2002 | Aksit et al. .................... | 277/411 |
| 2003/0039542 A1 | 2/2003 | Cromer | |
| 2003/0154719 A1 * | 8/2003 | Nishi et al. ...................... | 60/752 |
| 2009/0115141 A1 | 5/2009 | Simmons | |
| 2010/0003128 A1 | 1/2010 | Chila et al. | |

OTHER PUBLICATIONS

The Jet Engine, Jul. 1969, Rolls-Royce Limited, 3rd edition, pp. 9-14.*

* cited by examiner

*Primary Examiner* — Ehud Gartenberg
*Assistant Examiner* — Lorne Meade
(74) *Attorney, Agent, or Firm* — Cantor Colburn LLP

(57) ABSTRACT

According to one aspect of the invention, a shim for sealing two adjacent turbine transition pieces is disclosed. The shim includes a circumferential member that includes a first lateral flange and a second lateral flange. Further, the first and second lateral flanges each comprise a tab configured to mate to a first surface plane and the first and second lateral flanges are configured to mate to a second surface plane, wherein the first and second surface planes are substantially parallel. In addition, the shim includes a first flange extending substantially perpendicular from the circumferential member.

15 Claims, 9 Drawing Sheets

100 # SHIM FOR SEALING TRANSITION PIECES

FEDERAL RESEARCH STATEMENT

This invention was made with Government support under Contract No. DE-FC26-05NT42643, awarded by the US Department of Energy (DOE). The Government has certain rights in this invention.

BACKGROUND OF THE INVENTION

The subject matter disclosed herein relates to gas turbines. More particularly, the subject matter relates to transition piece assemblies in gas turbines.

In a gas turbine, a combustor converts chemical energy of a fuel or an air-fuel mixture into thermal energy. The thermal energy is conveyed by a fluid, often compressed air from a compressor, to a turbine where the thermal energy is converted to mechanical energy. Increased conversion efficiency leads to reduced emissions, such as reduced nitrous oxide emissions. Several factors influence the efficiency of the conversion of thermal energy to mechanical energy. The factors may include blade passing frequencies, fuel supply fluctuations, fuel type and reactivity, combustor head-on volume, fuel nozzle design, air-fuel profiles, flame shape, air-fuel mixing, flame holding and gas flow leakages between components. For example, leaks in flow of air from the compressor discharge casing side of the combustor through the interface between the transition piece(s) and the stage one turbine nozzle(s) can cause increased emissions by causing air to bypass the combustor resulting in higher peak gas temperatures. Leaks may be caused by thermal expansion of certain components and relative movement between components. Accordingly, reducing gas leaks in the assembly between the transition piece and nozzle can improve efficiency and performance of the turbine.

BRIEF DESCRIPTION OF THE INVENTION

According to one aspect of the invention, a shim for sealing two adjacent turbine transition pieces is disclosed. The shim includes a circumferential member that includes a first lateral flange and a second lateral flange. Further, the first and second lateral flanges each comprise a tab configured to mate to a first surface plane and the first and second lateral flanges are configured to mate to a second surface plane, wherein the first and second surface planes are substantially parallel. In addition, the shim includes a first flange extending substantially perpendicular from the circumferential member.

According to another aspect of the invention, a gas turbine is disclosed, wherein the gas turbine includes an annular array of transition pieces, each extending between a combustor and a stage one nozzle, wherein a transition piece seal assembly is located between each transition piece and the stage one nozzle. The gas turbine also includes a shim located at an interface between adjacent transition piece seal assemblies, wherein the shim comprises a first lateral flange configured to receive a corner of a first transition piece seal assembly and a second lateral flange configured to receive a corner of a second transition piece seal assembly.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the disclosure together with advantages and features, by way of example with reference to the drawings.

DETAILED DESCRIPTION OF THE INVENTION

Figure 1:
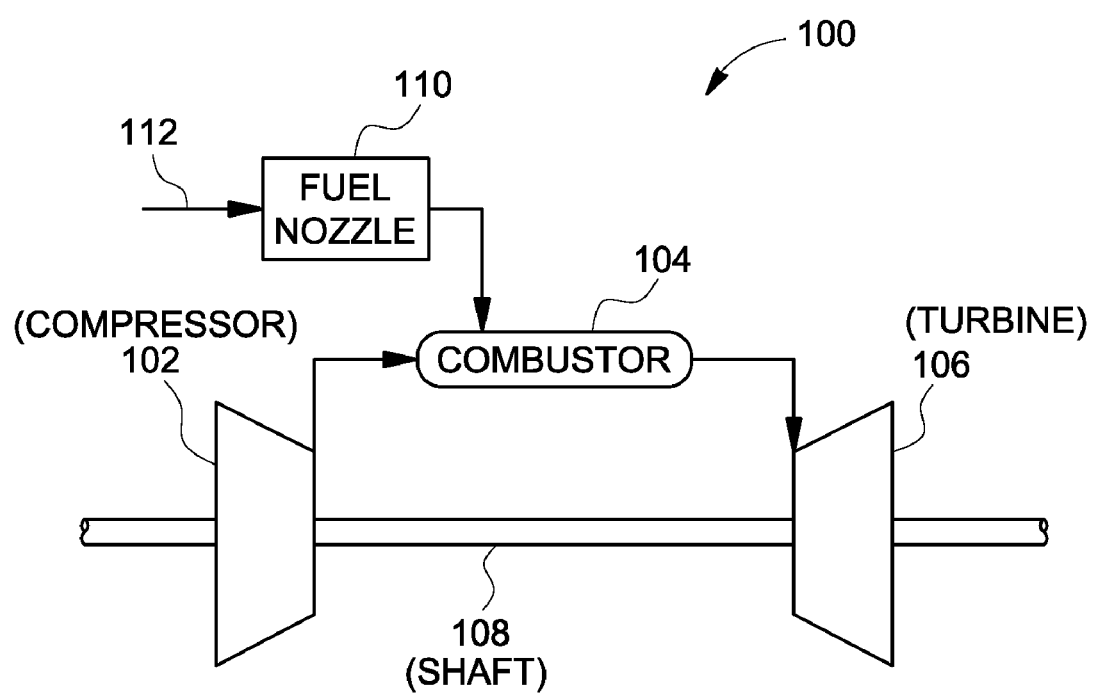
FIG. 1 is a schematic drawing of an embodiment of a gas turbine engine, including a combustor, fuel nozzle, compressor and turbine.

FIG. 1 is a schematic diagram of an embodiment of a gas turbine system 100. The system 100 includes a compressor 102, a combustor 104, a turbine 106, a shaft 108 and a fuel nozzle 110. In an embodiment, the system 100 may include a plurality of compressors 102, combustors 104, turbines 106, shafts 108 and fuel nozzles 110. The compressor 102 and turbine 106 are coupled by the shaft 108. The shaft 108 may be a single shaft or a plurality of shaft segments coupled together to form shaft 108.

In an aspect, the combustor 104 uses liquid and/or gas fuel, such as natural gas or a hydrogen rich synthetic gas, to run the engine. For example, fuel nozzles 110 are in fluid communication with an air supply and a fuel supply. The fuel nozzles 110 create an air-fuel mixture, and discharge the air-fuel mixture into the combustor 104, thereby causing a combustion that creates a hot pressurized exhaust gas. The combustor 104 directs the hot pressurized exhaust gas through a transition piece (not shown) into a turbine nozzle (or "stage one nozzle"), causing turbine 106 rotation. The rotation of turbine 106 causes the shaft 108 to rotate, thereby compressing the air as it flows into the compressor 102. In an embodiment, each of an array of combustors is coupled to a transition piece positioned between the combustor and a nozzle of the turbine. The interface between these transition pieces is discussed in detail with reference to FIGS. 2-6.

Figure 2:
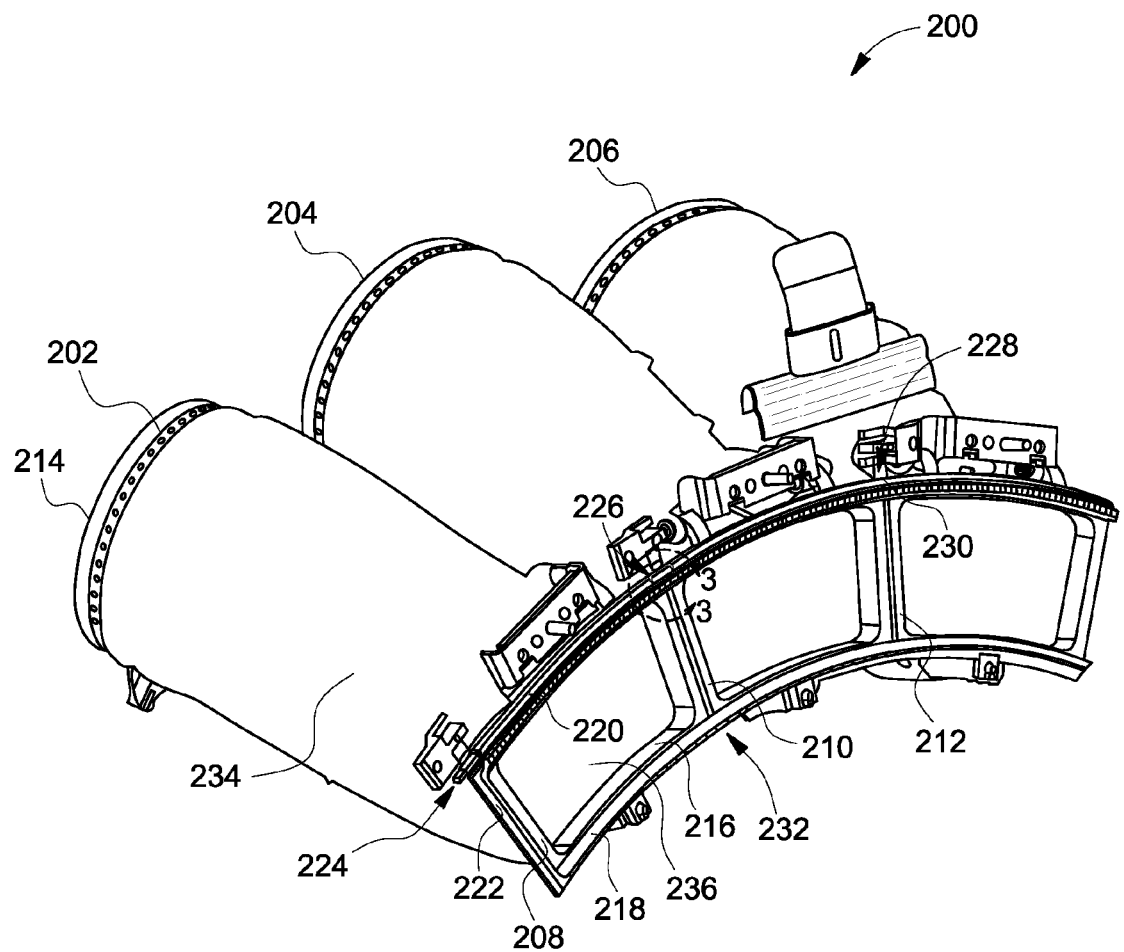
FIG. 2 is a perspective view of a portion of an embodiment of a gas turbine engine, including a plurality of transition pieces.

FIG. 2 is a perspective view of a portion of an embodiment of a gas turbine engine 200, including an array of transition pieces 202, 204 and 206. Each transition piece 202, 204 and 206 is coupled to a respective transition piece seal assembly 208, 210 and 212. As depicted, the transition pieces 202, 204 and 206 are coupled to combustors at an end 214, where the transition pieces 202, 204 and 206 receive a hot gas flow. The transition pieces 202, 204 and 206 are coupled to stage one nozzles of a turbine at end 216, where the hot gas flows into each turbine. In an embodiment, each transition piece seal assembly 208, 210 and 212 includes an inner transition seal 218, outer transition seal 220 and side seal 222. The components are discussed herein with respect to transition piece seal assembly 208, however, it should be understood that each transition piece seal assembly (208, 210, 212) may include similar components located in an array of transition pieces of a turbine engine. In addition, transition piece seal assembly 208 is described as being adjacent to transition piece seal assembly 210, as are assemblies 210 and 212.

In an embodiment, shims 224 and 226 are used to join adjacent transition piece seal assemblies and control a leakage of pressurized air flowing from on an external or outer portion of one or more transition pieces into the hot gas path. For example, transition piece seal assembly 208 is joined to transition piece seal assembly 210 by shim 226, wherein the shim reduces air leakage between components. Further, shim 224 controls a leakage between transition piece seal assembly 208 and an adjacent seal assembly (not shown). Interface 228 shows a joint between transition piece seal assembly 210 and transition piece seal assembly 212 without a shim, wherein a gap 230 exists between the components. As depicted by shim 226, the shim has two lateral flanges, each flange configured to receive respective adjacent corner portions of the seal assemblies 208 and 210. Accordingly, the shims 224 and 226 are configured to cover a gap, such as gap 230, to reduce a leakage of gas in the turbine as it flows to the turbine nozzle portion of the engine, thereby enabling more of the hot gas to be converted to mechanical energy and improve turbine performance. As discussed herein, a shim is a member, of any suitable thickness and material, configured to fill or reduce a gap between components. The shim (224, 226) geometry and application, as described herein, may apply to an interface between transition piece seal corners at either the inner seal 218 or outer seal 220. For example, substantially the same shim geometry as discussed herein may be used to control leakage at an inner seal interface 232 as well as outer seal interface 228. Further, in an embodiment, the shims 224 and 226 are retained in place by a pressure differential caused by a pressure 234 external to the transition pieces 202, 204 and 206 that is greater than a pressure 236 inside the transition pieces. The pressure differential may be used in addition to spot welds and other suitable coupling methods to attach the shims 224 and 226 to selected locations in the turbine 200. In addition, the shim geometry is altered to fit different seal geometries other than the depicted example.

Figure 3A:
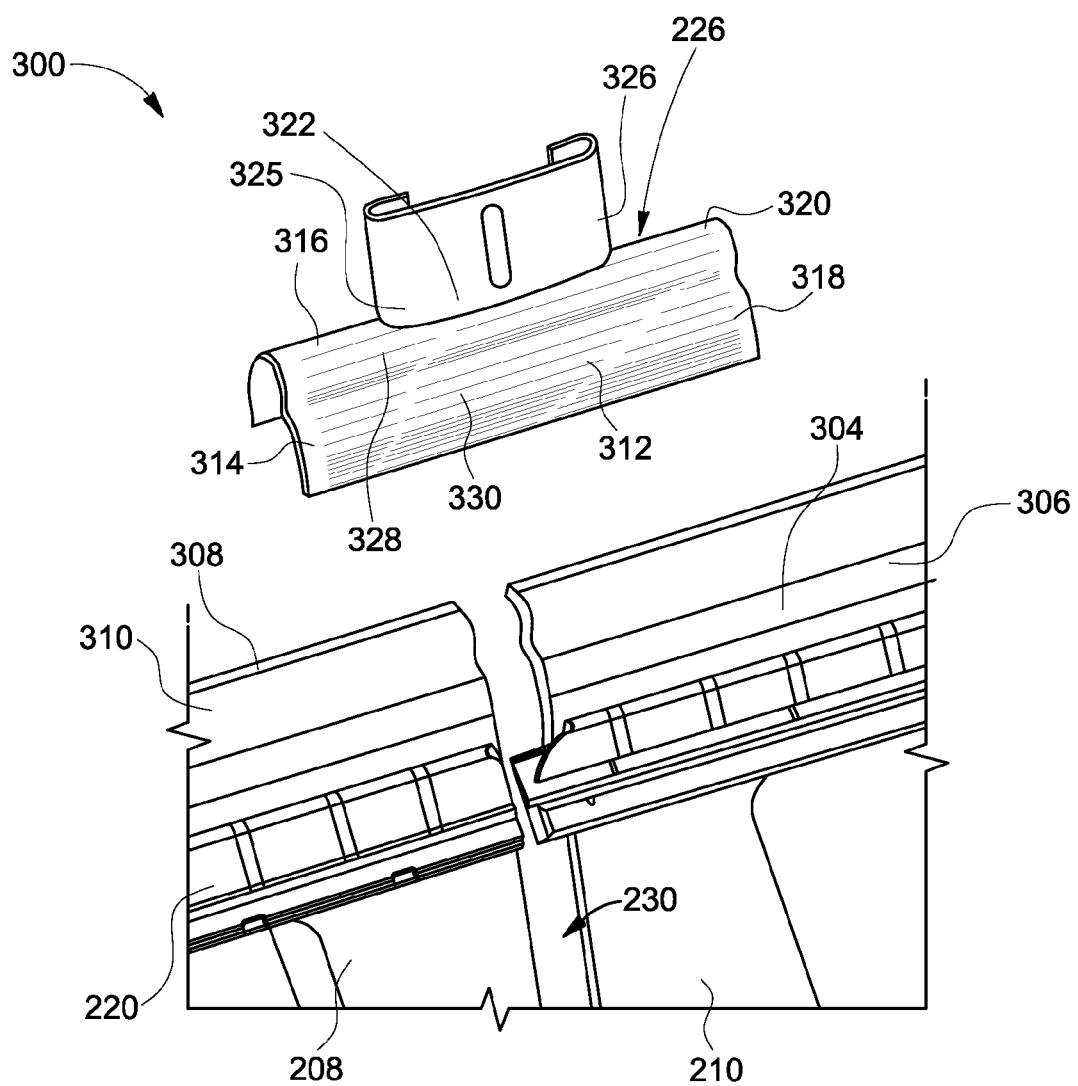
FIGS. 3A and 3B are detailed views of an embodiment of a shim located at an interface of adjacent transition pieces.
Figure 3B:
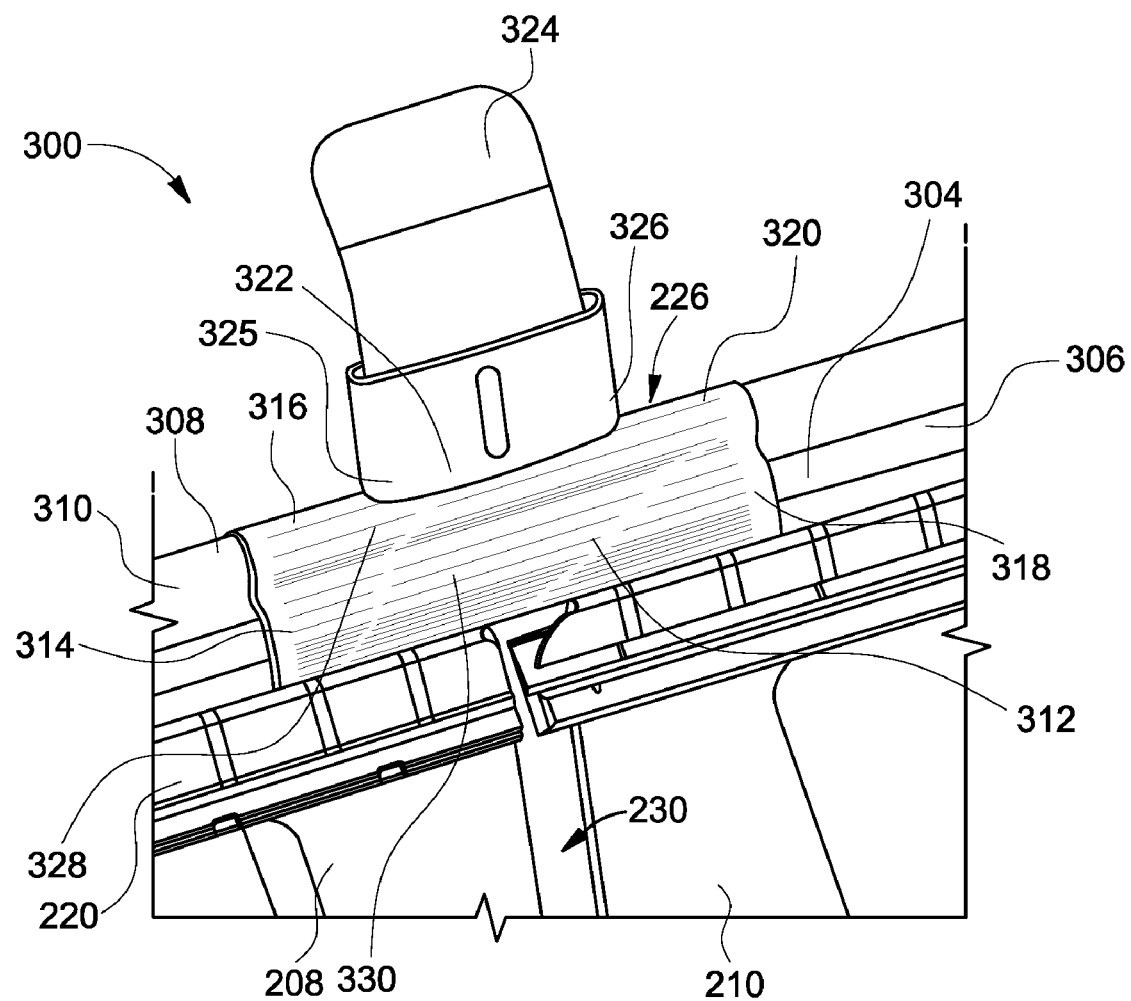

FIGS. 3A and 3B are detailed views of an embodiment of an interface 300 of adjacent transition pieces and the shim 226 configured to control leakage at a gap in the interface (230, FIG. 2). The shim 226 is positioned between a first corner portion 304 of a first transition piece seal 306 and a second corner portion 308 of a second transition piece seal 310. In the depicted embodiment, the shim 226 includes a circumferential member 312 laterally spanning the gap between the corner portions 304 and 308. The circumferential member 312 includes a first lateral flange 314 with a first tab 316 and a second lateral flange 318 with a second tab 320. The shim 226 also includes a vertical flange 322 configured to attach to a side seal 324 via tabs 325 and 326. In an embodiment, the shim 302 includes one or more ridges 328 and 330 (also referred to as "steps" or "stairs") to enable the shim 226 to conform to corner portions 304 and 308. As depicted, the shim 226 is secured to surfaces of corner portions 304 and 308 by tabs 320 and 316, respectively. In addition, the shim 226 may be secured or coupled to the corner portions 304, 308 and side seal 324 by any suitable means, including, but not limited to, welds, brazes, mechanical clips, pins, rivets, bolts or any combination thereof. For example, tabs 316, 320, 325 and 326 are bent to conform to the backside of the corner portions 304, 308 and side seal 324, wherein welds on the members couple the shim 226 in the desired position in interface 300.

In other embodiments, the shim 226 does not include tabs, wherein the flanges (314, 318, 322) are welded to the transition piece seals 306 and 310. In another embodiment, the shim 226 does not include a vertical flange, where the lateral flanges 314 and 318 are secured to corner portions 304 and 308 to control a leakage at interface 300. The shim 226 may be formed by any suitable method, such as cutting, stamping and forming a sheet metal, such as stainless steel or steel alloy, into the desired geometry. As depicted in FIG. 3A, the geometry of the shim 226 is described as a T-shape. In an embodiment, the flanges 314, 318 and 322 are welded to attach to the circumferential member 312. The circumferential member 312 is described as such because the member substantially lays laterally across the circumference of outer or inner seal assemblies. In one embodiment, the shim 226 is configured to reduce a leakage at the interface 300 by about 5% to 75%, as compared to an interface without a shim, thereby improving turbine performance and efficiency. In another embodiment, the shim 226 is configured to reduce a leakage at the interface 300 by about 10% to 50%, as compared to an interface without a shim, thereby improving turbine performance and efficiency. In yet another embodiment, the shim 226 is configured to reduce a leakage at the interface 300 by about 15% to 35%, as compared to an interface without a shim, thereby improving turbine performance and efficiency. In another embodiment, the shim 226 is configured to reduce a leakage at the interface 300 by about 25%, as compared to an interface without a shim, thereby improving turbine performance and efficiency.

Figure 4A:
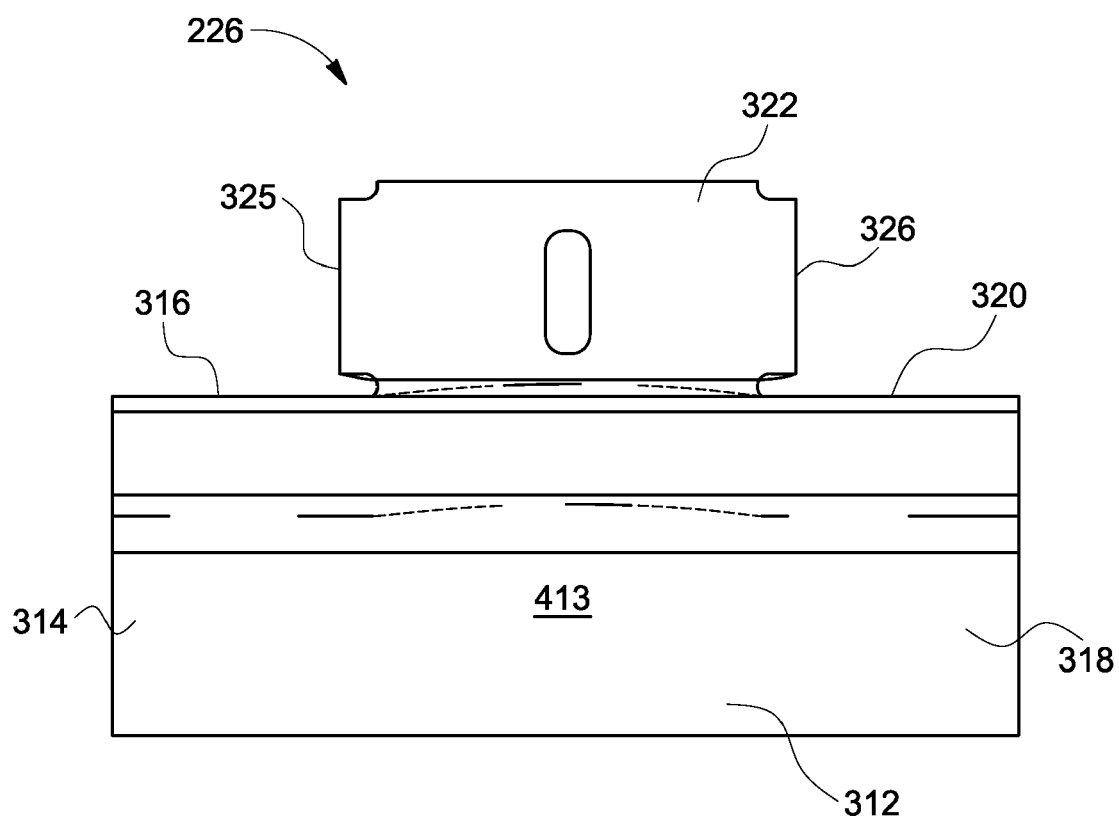
FIGS. 4A and 4B are front views of an embodiments of a shim.
Figure 4B:
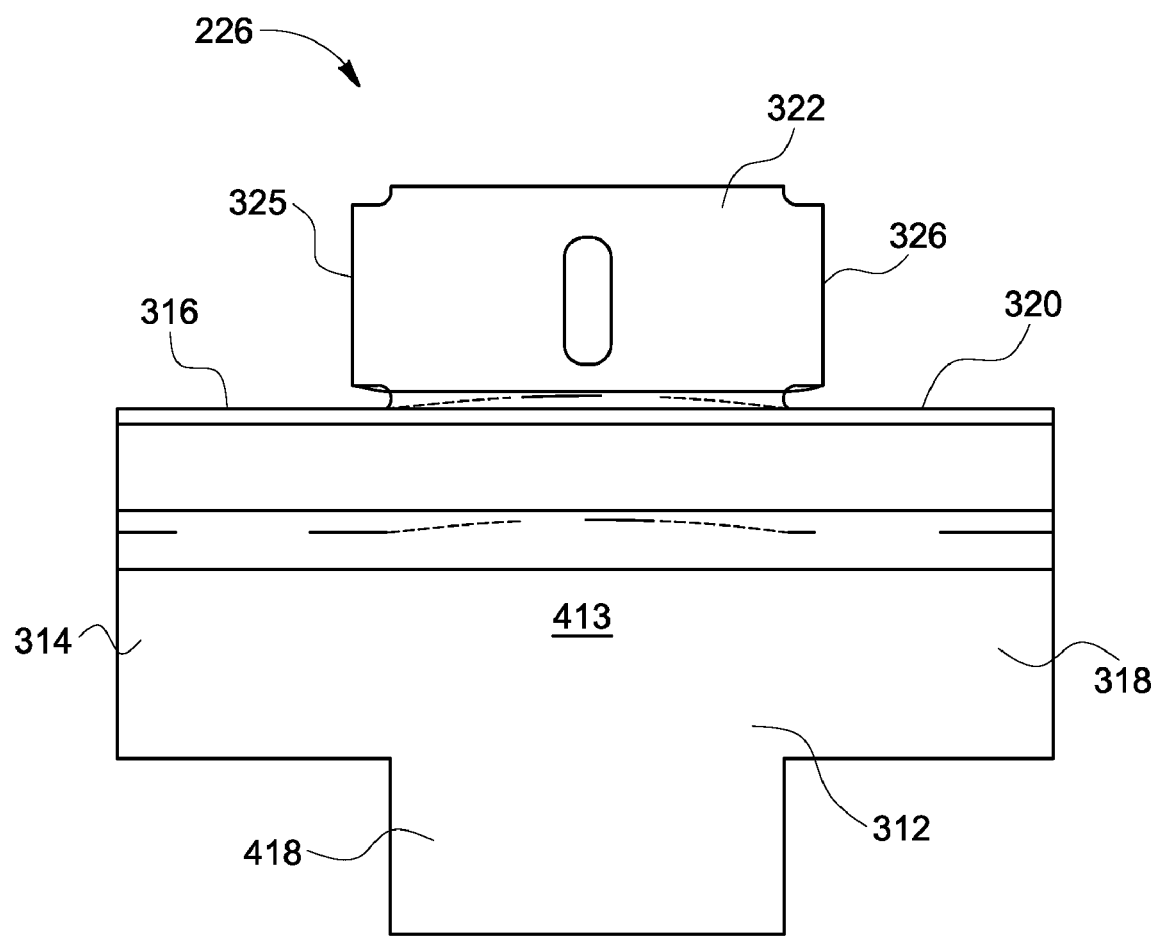

FIG. 4A is a front view of an embodiment of the shim 226. The shim 226 includes the circumferential member 312 and the first lateral flange 318 with a tab 320. The circumferential member 312 also includes the second lateral flange 314 with a tab 316. The first vertical flange 322 extends from an edge of a central portion 413 of the circumferential member 312, where the first vertical flange 322 includes tabs 326 and 325. As depicted in the embodiment of FIG. 4B, a second vertical flange 418 extends from an edge of the central portion 413 opposite the first vertical flange 322. In an embodiment, the second vertical flange 418 is an optional flange configured to control a leakage proximate a spring seal interface of adjacent transition piece seal assemblies.

Figure 5:
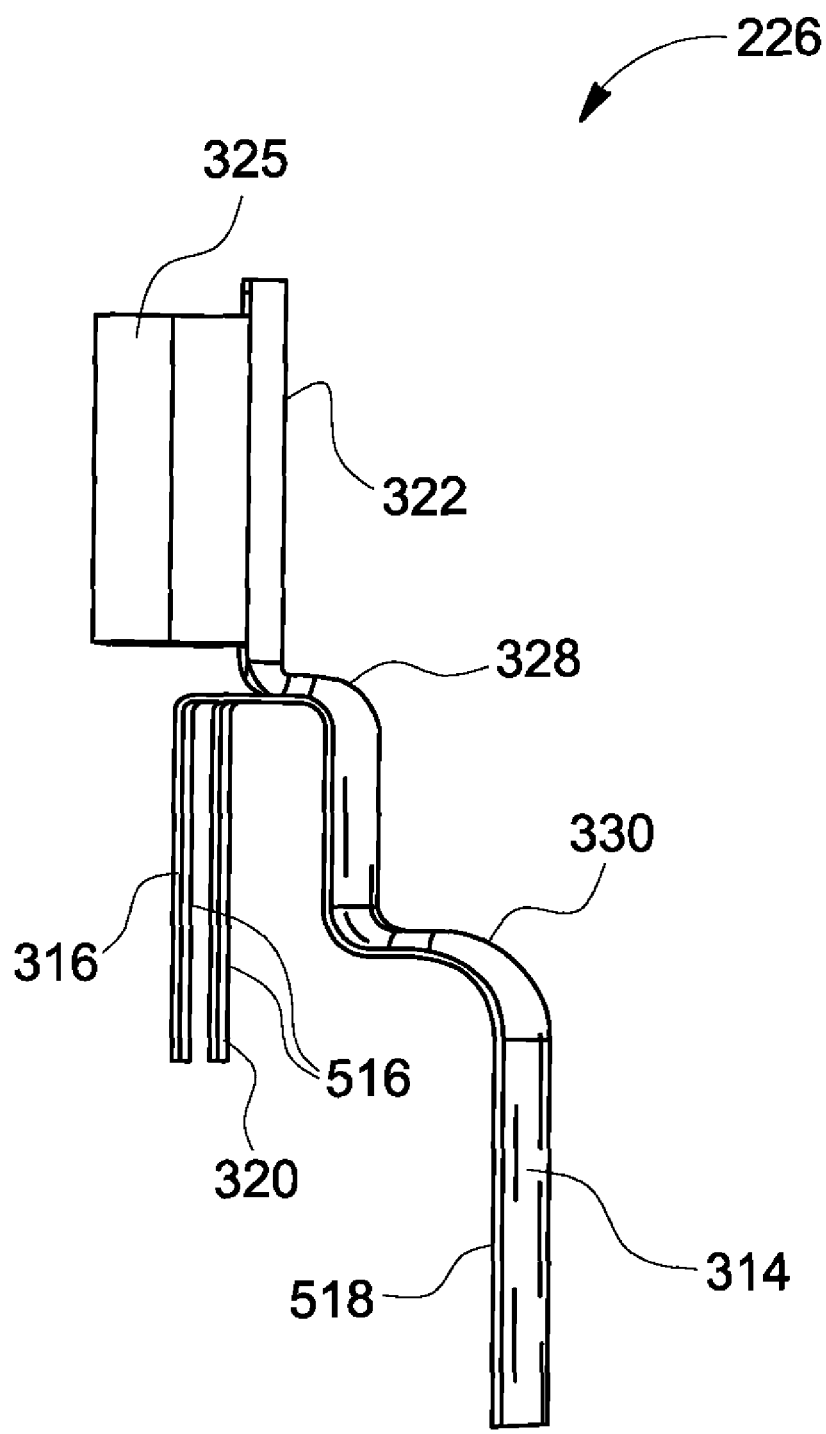
FIG. 5 is a side view of an embodiment of a shim.

FIG. 5 is a side view of an embodiment of the shim 226. The shim 226 includes the circumferential member 312 and the first lateral flange 314 with the tab 316. The circumferential member 312 also includes a second lateral flange 318 (not shown) with the second tab 320. The first vertical flange 322 extends from an edge of the circumferential member 312, where the first vertical flange 322 includes one or more tab 325. As depicted, the tabs 320 and 316 are configured to mate a first surface 516 to a first plane. Further, a second surface 518 of the lateral flange 314 and circumferential member 312 is configured to mate to a second plane, wherein the second plane is substantially parallel to the first plane. In one embodiment, the surfaces 516 and 518 are mated to opposite sides of adjacent transition piece seal assemblies, wherein the tabs 320 and 316 secure the shim 226 in place in the interface.

Figure 6:
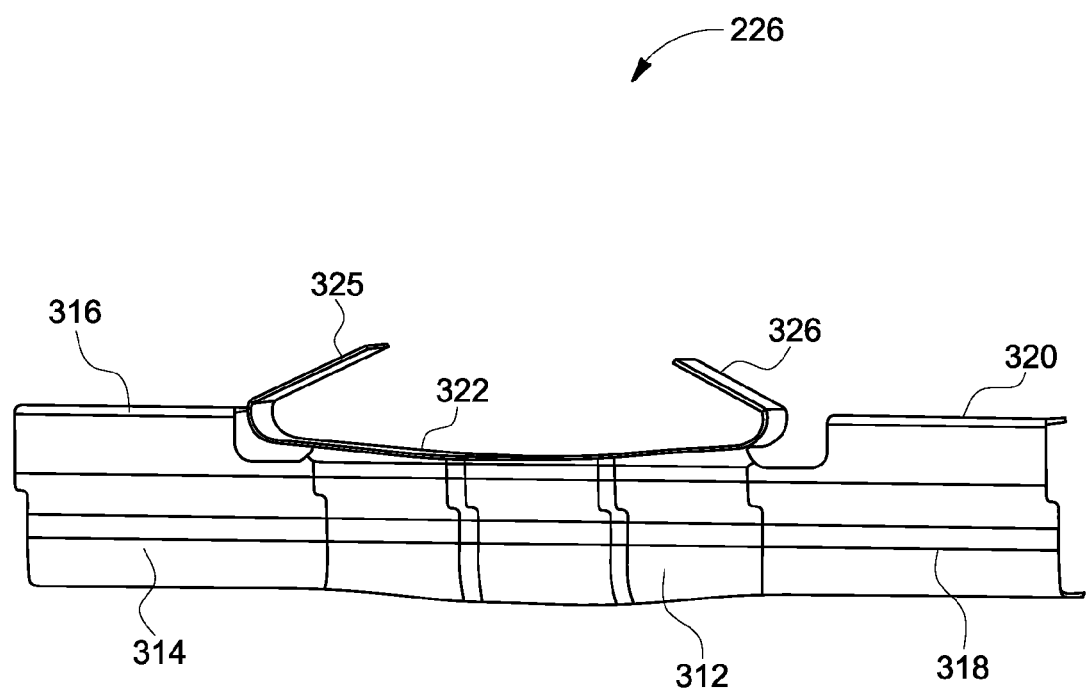
FIG. 6 is a top view of an embodiment of a shim.

FIG. 6 is a top view of an embodiment of the shim 226. The shim 226 includes the circumferential member 312 and the first lateral flange 318 with the tab 320. The circumferential member 312 also includes the second lateral flange 314 with the tab 316. The first vertical flange 322 extends from an edge of the circumferential member 312, where the first vertical flange 322 includes tabs 326 and 325.

Figure 7:
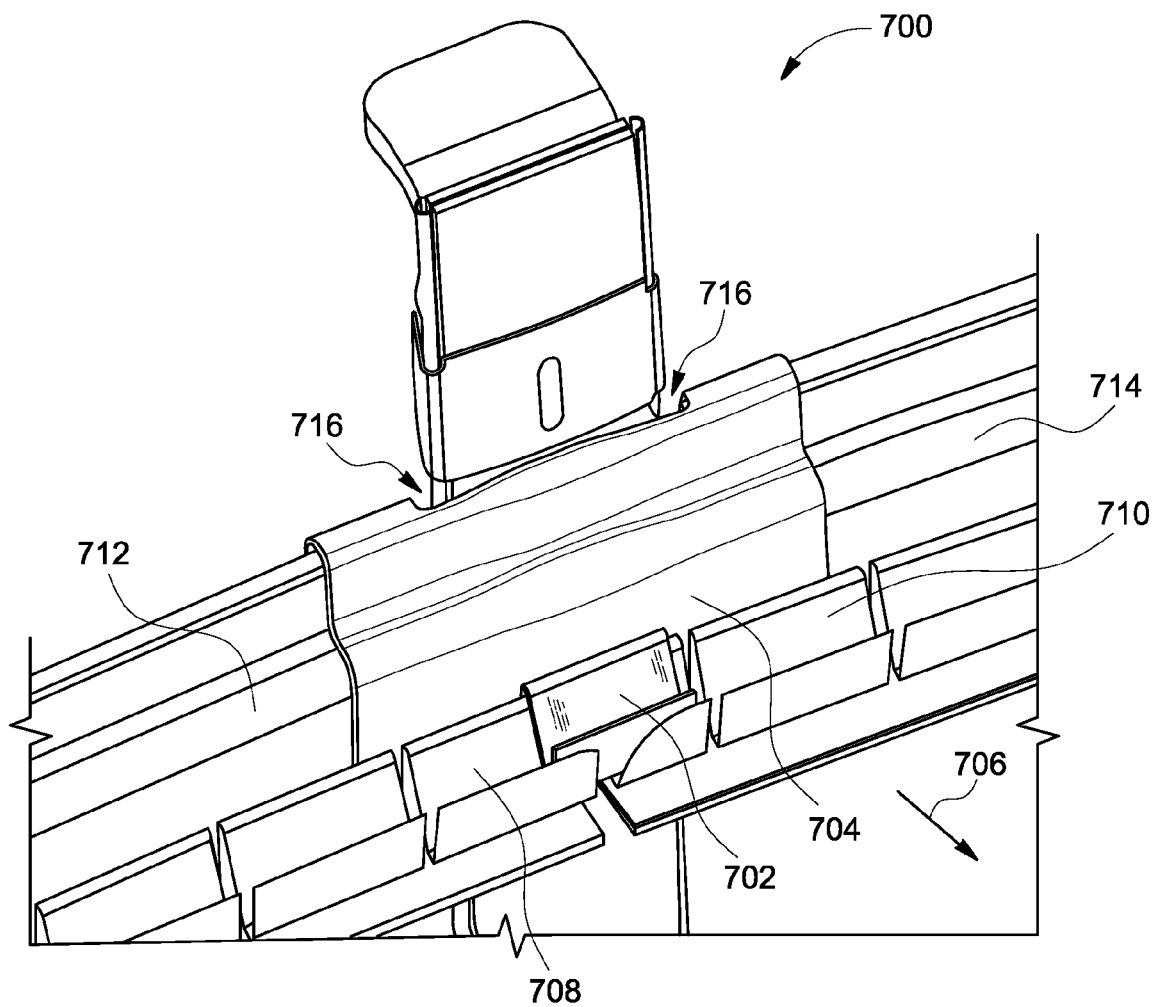
FIG. 7 is a side view of another embodiment of a shim.

FIG. 7 is a perspective view of another embodiment of a shim 700 with a flange 702 extending from a circumferential member 704 in axial direction 706. The flange 702 is conformed to substantially cover a gap between adjacent lateral members 708 and 710. The lateral members 708 and 710 are portions of adjacent transition piece seal assemblies 712 and 714, respectively. Further, the circumferential member 704 includes lateral flexible joints 716 that allow relative movement of transition pieces 712 and 714. The joints 716 are composed of a suitable durable and flexible material, such as a steel alloy. It should be noted that the surface profile of the shim and its protrusions or flanges is altered to cover any gaps between the adjoining turbine and transition piece components. Further, the method of attachment may also be altered for each application.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A shim for sealing two adjacent turbine transition pieces of a gas turbine combustor,
  each transition piece extending between the combustor and a stage one nozzle,
  wherein a transition piece seal assembly is located between each transition piece and the stage one nozzle, wherein each transition piece seal assembly comprises a left radial side-seal, a right radial side-seal, an outer circumferential seal with a radially outer-facing surface profile, and an inner circumferential seal with a radially inner-facing surface profile,
  where a plurality of outer circumferential seal form an annular array with a larger radial diameter than an annular array formed by a plurality of the inner circumferential seals,
  said shim installed in a radially inward or outward direction to cover a circumferential gap between two adjacent of said outer circumferential seals in a first configuration, or two adjacent of said inner circumferential seals in a second configuration, respectively, of adjacent first and a second transition piece seal assemblies,
  the shim comprising a circumferential portion with a first lateral flange and a second lateral flange,
  in the first configuration, the first lateral flange is shaped to slide over the outer radial surface profile of a right corner of the first transition piece seal assembly outer circumferential seal and the second lateral flange is shaped to slide over the outer radial surface profile of a left corner of the second transition piece seal assembly outer circumferential seal,
  in the second configuration, the first lateral flange is shaped to slide over the inner radial surface profile of a right corner of the first transition piece seal assembly inner circumferential seal and the second lateral flange shaped to slide over the inner radial surface profile of a left corner of the second transition piece seal assembly inner circumferential seal.

2. The shim of claim 1, wherein the shim is configured to be coupled to the first and second transition piece seal assemblies by welds.

3. The shim of claim 1, wherein the shim is configured to reduce leakage of gas between the adjacent first and second transition piece seal assemblies by 15% to 35 as compared to a leakage between the adjacent first and second transition piece seal assemblies without the shim.

4. A gas turbine comprising:
  an annular array of transition pieces, each extending between a combustor and a stage one nozzle,
  wherein a transition piece seal assembly is located between each transition piece and the stage one nozzle;
  wherein each transition piece seal assembly comprises a left radial side-seal, a right radial side-seal, an outer circumferential seal with a radially outer-facing surface profile, and an inner circumferential seal with a radially inner-facing surface profile,
  where a plurality of outer circumferential seal form an annular array with a larger radial diameter than an annular array formed by a plurality of the inner circumferential seals; and
  a shim installed in a radially inward or outward direction to cover a circumferential gap between two adjacent of said outer circumferential seals in a first configuration, or two adjacent of said inner circumferential seals in a second configuration, respectively, of adjacent first and a second transition piece seal assemblies, the shim comprising a circumferential portion with a first lateral flange and a second lateral flange,
  in the first configuration, the first lateral flange is shaped to slide over the outer radial surface profile of a right corner of the first transition piece seal assembly outer circumferential seal and the second lateral flange is shaped to slide over the outer radial surface profile of a left corner of the second transition piece seal assembly outer circumferential seal,
  in the second configuration, the first lateral flange is shaped to slide over the inner radial surface profile of a right corner of the first transition piece seal assembly inner circumferential seal and the second lateral flange shaped to slide over the inner radial surface profile of a left corner of the second transition piece seal assembly inner circumferential seal.

5. The gas turbine of claim 4, wherein the first lateral flange comprises a first tab and the second lateral flange comprises a second tab, wherein the first and second tabs secure respective corners of the first and second transition piece seal assemblies.

6. The gas turbine of claim 4, wherein the shim comprises a first flange that extends substantially perpendicular from the first and second lateral flanges, thereby forming a T-shape.

7. The gas turbine of claim 6, wherein the first flange comprises at least one tab configured to receive a transition piece side seal.

8. The gas turbine of claim 6, comprising a second flange extending from an edge of the shim opposite the first flange.

9. The gas turbine of claim 8, wherein the second flange extends in an axial direction and is configured to conform to substantially cover a gap between a first lateral member of the first transition piece seal assembly and an adjoining second lateral member of the second transition piece seal assembly.

10. The gas turbine of claim 6, wherein the first and second lateral flanges include ridges to conform to the first and second transition piece seal assemblies.

11. The gas turbine of claim 4, wherein the shim is configured to be coupled to the first and second transition piece seal assemblies by welds.

12. The gas turbine of claim 4, wherein the first and second lateral flanges each comprise a tab configured to mate to a first surface plane and the first and second lateral flanges are configured to mate to a second surface plane, wherein the first and second surface planes are substantially parallel.

13. The gas turbine of claim 4, wherein the shim is configured to reduce a leakage of gas between the first and second transition piece seal assemblies by about 15% to 35% as compared to a leakage between the first and second transition piece seal assemblies without the shim.

14. The gas turbine of claim 4, wherein the shim is retained in the interface by a pressure of an air flow external to the transition pieces.

15. The gas turbine of claim 14, wherein the pressure external to the transition pieces is greater than a pressure within the transition pieces.

* * * * *